United States Patent [19]

Dorius et al.

[11] Patent Number: 5,798,889
[45] Date of Patent: Aug. 25, 1998

[54] NEGATIVE PRESSURE AIR BEARING

[75] Inventors: Lee Kevin Dorius, San Jose; John M. Harker, Palo Alto; Laurence Scott Samuelson, San Jose, all of Calif.

[73] Assignee: International Business Machines Corporation, Armonk, N.Y.

[21] Appl. No.: 431,935

[22] Filed: May 1, 1995

Related U.S. Application Data

[63] Continuation-in-part of Ser. No. 967,359, Oct. 28, 1992, Pat. No. 5,438,467.

[51] Int. Cl.$^6$ .................................................. G11B 21/21
[52] U.S. Cl. .................................................. 360/103
[58] Field of Search .................................. 360/102, 103

[56] References Cited

U.S. PATENT DOCUMENTS

| | | | |
|---|---|---|---|
| 3,678,482 | 7/1972 | Billawala | 360/103 |
| 3,855,625 | 12/1974 | Garnier et al. | 360/103 |
| 4,212,044 | 7/1980 | Plotto | 360/103 |
| 4,218,715 | 8/1980 | Garnier | 360/103 |
| 4,475,135 | 10/1984 | Warner et al. | 360/103 |
| 4,553,184 | 11/1985 | Ogishima | 360/103 |
| 4,555,739 | 11/1985 | Le Van et al. | 360/103 |
| 4,636,894 | 1/1987 | Mo | 360/103 |
| 4,802,042 | 1/1989 | Strom | 360/103 |
| 4,894,740 | 1/1990 | Chhabra et al. | 360/103 |
| 5,047,884 | 9/1991 | Negishi et al. | 360/122 |
| 5,062,017 | 10/1991 | Strom et al. | 360/103 |
| 5,200,867 | 4/1993 | Albrecht et al. | 360/103 |
| 5,200,868 | 4/1993 | Chapin et al. | 360/103 |
| 5,210,666 | 5/1993 | Chapin et al. | 360/103 |
| 5,267,109 | 11/1993 | Chapin et al. | 360/103 |
| 5,287,235 | 2/1994 | Cunningham et al. | 360/103 |
| 5,309,303 | 5/1994 | Hsia et al. | 360/103 |

FOREIGN PATENT DOCUMENTS

| | | | |
|---|---|---|---|
| 0 155 756 | 9/1985 | European Pat. Off. | |
| 387444 | 9/1990 | European Pat. Off. | 360/103 |
| 58-23359 | 2/1983 | Japan | 360/103 |
| 59-58661 | 4/1984 | Japan | |
| 69-32174 | 2/1985 | Japan | 360/103 |
| 61-148684 | 7/1986 | Japan | |
| 61-148685 | 7/1986 | Japan | 360/103 |
| 61-160885 | 7/1986 | Japan | 360/103 |
| 63-138580 | 6/1988 | Japan | |
| 1-245480 | 9/1989 | Japan | 360/103 |
| 2-132688 | 5/1990 | Japan | 360/103 |
| 3-125378 | 5/1991 | Japan | 360/103 |
| 4-32081 | 2/1992 | Japan | 360/103 |

OTHER PUBLICATIONS

"Tri-Rail Negative Pressure Air Bearing Design" by Dorius et al., Research Disclosure, Sep. 1991, No. 329, Kenneth Mason Publications Ltd., England.

Anonymous, "Roll Insensitive Slider Design for Improved Disk File Reliability", Research Disclosure, Nov. 1985, No. 259, Emsworth, Hampshire, Great-Britain.

IBM Technical Disclosure Bulletin, "Magnetic Head Air Bearing Slider", Decker et al. vol. 24, No. 6, Nov. 1981, p. 2803.

*Primary Examiner*—David L. Ometz
*Attorney, Agent, or Firm*—Gray Cary Ware Freidenrich

[57] ABSTRACT

A negative-pressure air bearing slider structure includes a slider surface disposed adjacent to a data storage medium, and a leading edge relative to the motion of the data storage medium. A U-shaped rail with a closed end facing the leading edge and an open end facing the trailing edge is formed on the slider surface. The closed end of the U-shaped rail extends laterally across less than the width of the slider surface. In a first set of embodiments, there is a single U-shaped rail centered between two side rails. In a second set of embodiments, there are two U-shaped rails, each disposed along a respective side of the slider surface.

18 Claims, 14 Drawing Sheets

PRIOR ART "A"

14.5g NEGATIVE LOAD MAX.

PRIOR ART "B"

13.8g NEGATIVE LOAD MAX.

PRIOR ART "C"

0g NEGATIVE LOAD MAX.

EMBODIMENT THREE

6g NEGATIVE LOAD MAX.

NEGATIVE PRESSURE AIR BEARING

CROSS REFERENCE TO RELATED APPLICATION

This is a continuation-in-part application of application Ser. No. 07/967,359, filed Oct. 28, 1992, now U.S. Pat. No. 5,438,467.

BACKGROUND OF THE INVENTION

1. Field of the Invention

This invention relates generally to computer data storage drives and more specifically to a negative air pressure air bearing slider structure employed in conjunction with data storage drives.

2. Description of the Related Art

The negative pressure air bearing slider designs of the prior art are generally preferable to conventional flat taper slider configurations. The negative pressure structure enables the utilization of low suspension preloads, yielding decreased stationary frictional forces. These forces are oftentimes referred to as "stictional" forces. Negative pressure structures also offer the potential for improved stop/start performance.

One shortcoming of state-of-the-art negative pressure air bearing designs is that the slider produces large negative loads. An example of such a design is disclosed in the Warner et al. reference, U.S. Pat. No. 4,475,135. These structures achieve a high air bearing stiffness which improves the compliance to the disk, but also increases the impact forces resulting from asperity and third-body contact. Such high-impact forces tend to degrade device reliability. Consequently, a structure offering the ability to optimize the amount of stiffness or negative pressure would be desirable. Another drawback of the prior art negative pressure air bearing is its high skew sensitivity. For zone bit recording applications, it is advantageous to maintain a constant spacing profile, but in rotary actuator file environments, the skew angle varies across the data band. Highly skew sensitive negative pressure designs experience high roll under these conditions resulting in a non-flat spacing profile. Thus, a negative pressure air bearing which is insensitive to skew would be desirable.

Although it is possible to adjust the amount of stiffness on existing slider structures by increasing the depth of the etched relief, this approach has significant drawbacks. Deepening the etched relief increases the fly height sensitivity of the slider structure. Furthermore, the reverse air current flow within the depths of the etched relief will be increased, thereby increasing the slider's propensity to accumulate debris. Therefore, it would be desirable to develop a technique for adjusting the negative pressure of the slider structure which is independent of the etch depth. It would also be desirable to provide a means for flushing debris through and out of the air bearing. It would also be desirable to provide an air bearing structure having improved static and dynamic performance over existing structures.

SUMMARY OF THE INVENTION

The air bearing slider of the present invention provides a structure which optimizes the amount of negative pressure provided by the slider structure. This slider is employed in conjunction with a data storage medium which may be engaged in motion relative to the slider. The slider structure includes a leading edge and a trailing edge, the edges being determined with reference to the motion of the data storage medium. The slider also includes a bottom surface which faces the data storage medium. The bottom surface extends between the leading edge and the trailing edge.

The negative pressure contours of the slider are determined by means of a U-shaped rail situated between two outer taper-flat pads on the bottom surface. The amount of negative pressure is controlled by adjusting the length and width of the area enclosed by the U-shaped rail. The two outer taper-flat pads provide roll stiffness. These pads may be extended to the trailing edge of the slider to provide a mounting location for a read/write element. Skew insensitivity is achieved by adjusting the relative widths of the U-shaped rail and the outer taper flat pads. The channels formed between the U-shaped rail and the outer taper flat pads provide a constant flow through the slider which flushes contamination. In this manner, the negative pressure contours may be optimized for specific device applications.

A second embodiment of the invention includes an isolated island positioned between the legs of a U-shaped rail. The purpose of the island is to provide means for mounting a read/write element to the slider. Two outer pads are employed for improving the roll stiffness characteristics of the slider. These pads may be offset from the trailing edge toward the leading edge of the slider to minimize roll sensitivity.

A third embodiment of the invention includes element mounting means in the form of a center rail extending from the U-shaped rail to the trailing edge of the slider structure. Two outer pads are employed, which may be offset from the trailing edge toward the leading edge of the slider to minimize roll sensitivity.

According to a fourth embodiment of the invention, the U-shaped rail can be situated at a position on the bottom surface between the leading and trailing edges of the slider structure. Centering the U-shaped rail between the lateral edges of the slider provides enhanced pitch angle and fly height design flexibility.

In an alternative embodiment of the slider, two U-shaped rails are spaced laterally on the bottom surface near the slider leading edge. Independent adjustment of the area enclosed by each U-shaped rail, as well as the relative widths of the inner and outer rails, provides enhanced skew insensitivity over previous embodiments.

BRIEF DESCRIPTION OF THE DRAWINGS

The various features, aspects, and advantages of the present invention will become apparent from the following more particular description thereof, presented in conjunction with the following drawings.

3

Figure 3A:
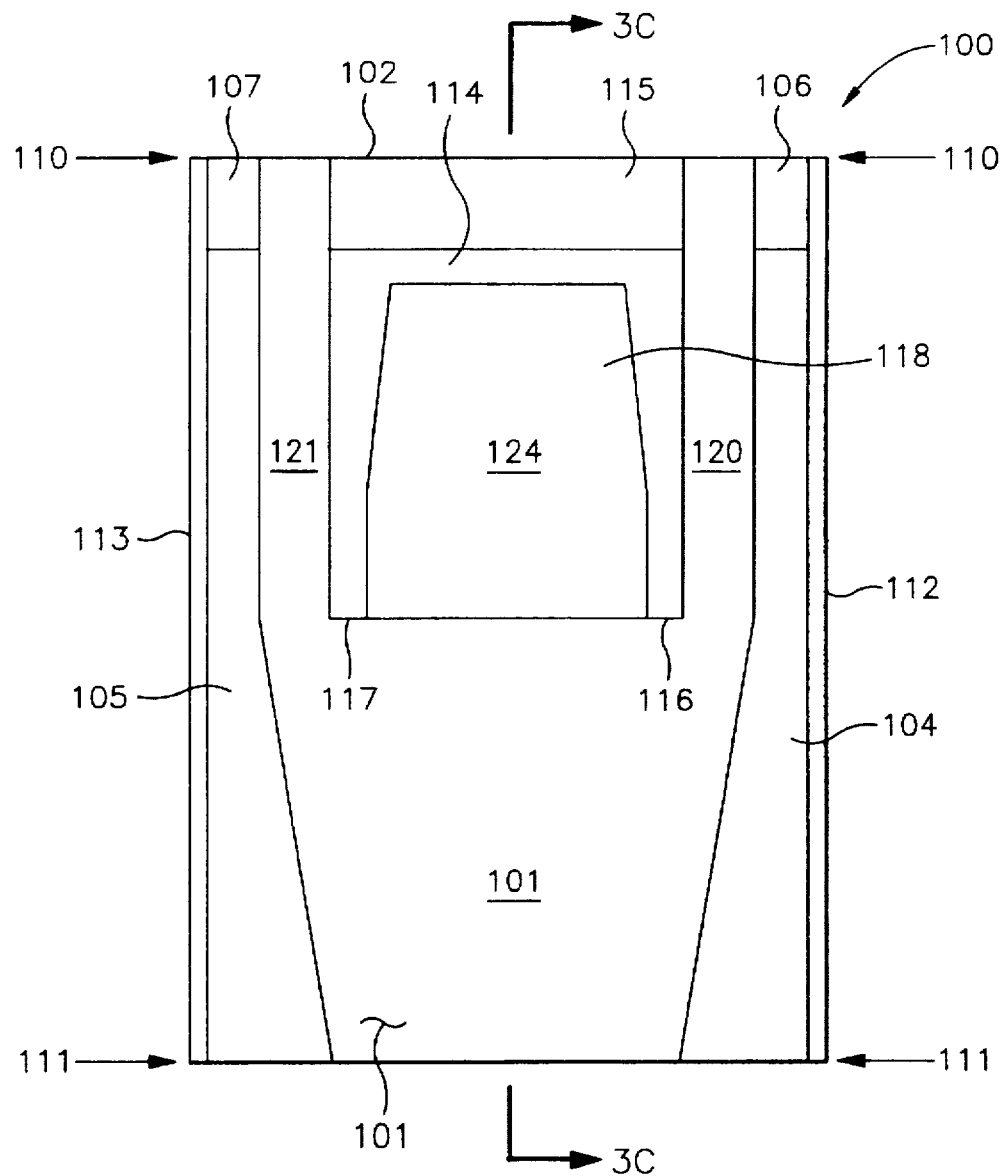
FIGS. 3A and 3B are bottom plan and rear elevation views, respectively, of a U-shaped rail air bearing slider structure according to a first embodiment of the present invention.
Figure 3B:
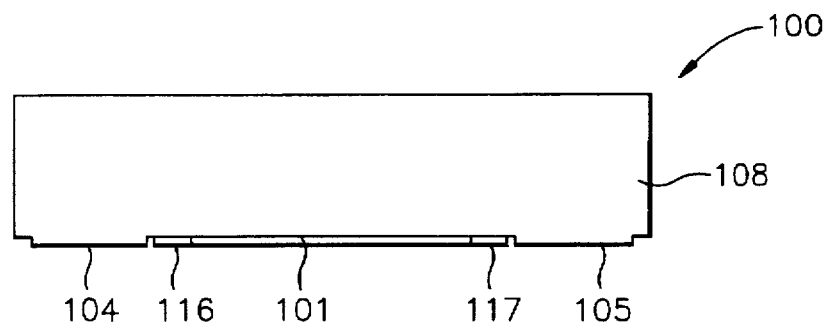
Figure 3C:
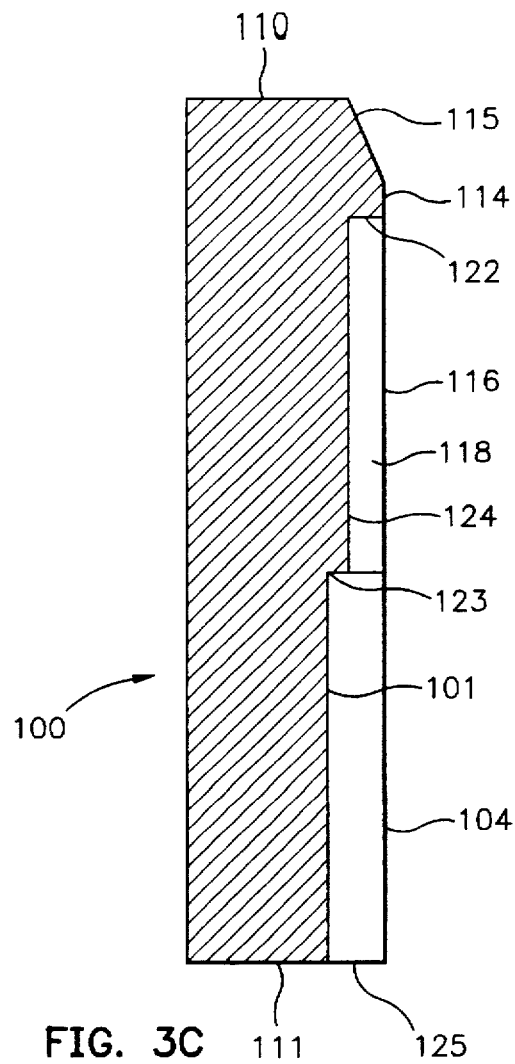
FIG. 3C is a cross-sectional view taken along plans 3C—3C of FIG. 3A.
Figure 3D:
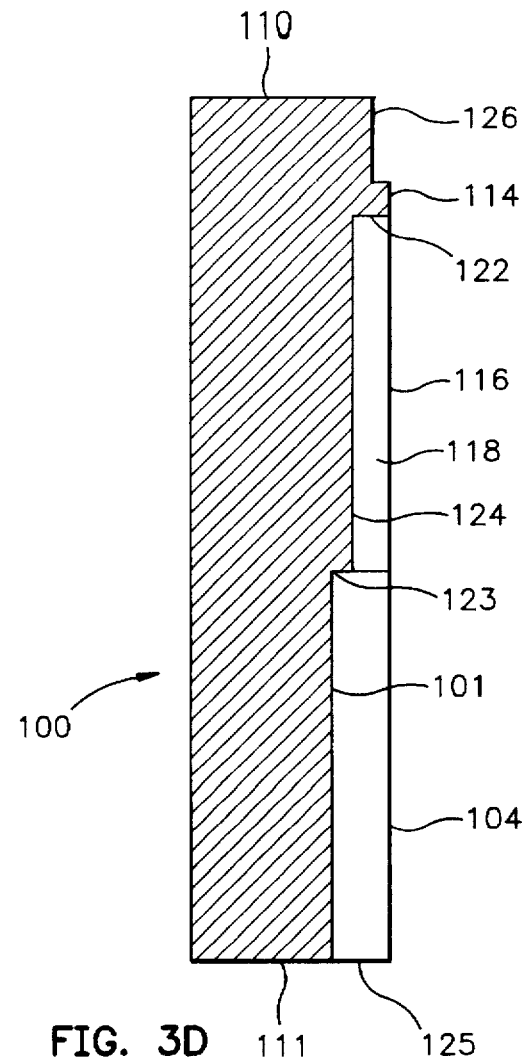
FIG. 3D is a cross-sectional view of an alternate embodiment of the slider structure of the present invention which employs a leading step compression feature instead of a taper.
Figure 3E:
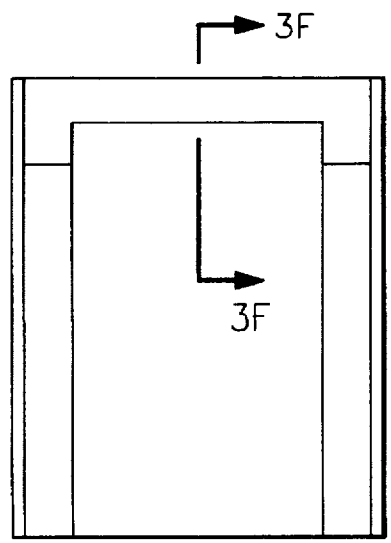

FIG. 3E is a bottom plan view of a prior art slider without a U-shaped rail.

Figure 3F:
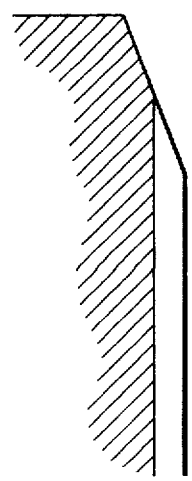

FIG. 3F is a cross-sectional view taken along plans 3F—3F of FIG. 3E.

Figure 3G:
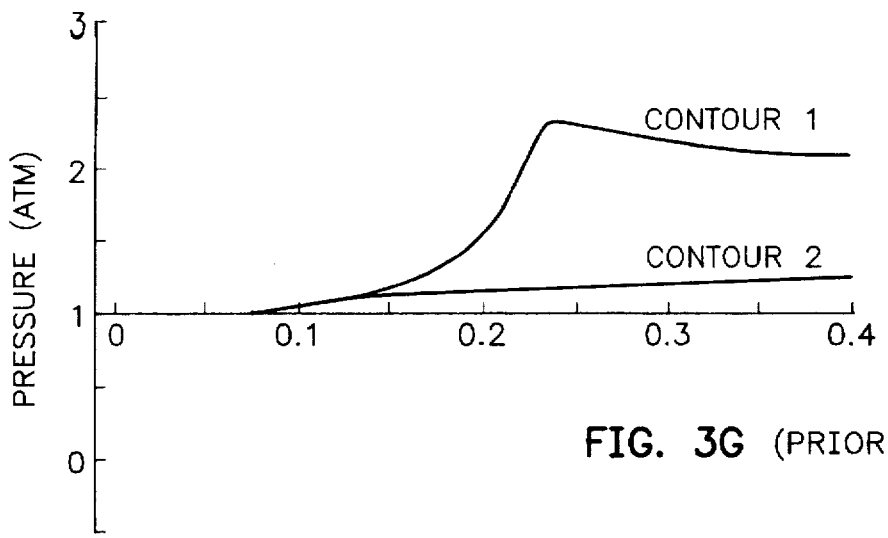

FIG. 3G is a graph of pressure contours along the prior art slider.

Figure 3H:
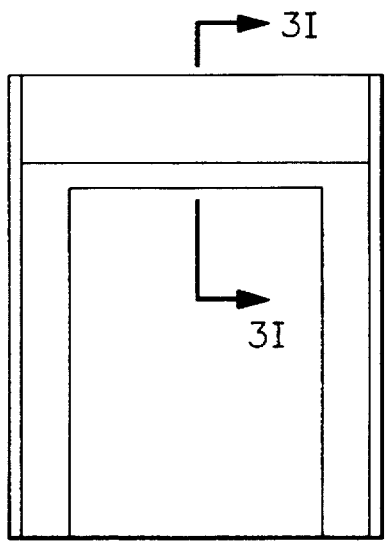

FIG. 3H is a bottom plan view of a slider with a U-shaped rail adjacent a tapered leading edge.

Figure 3I:
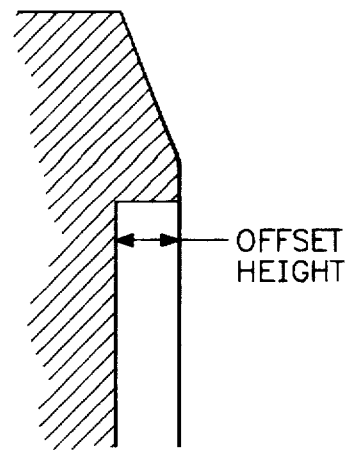

FIG. 3I is a cross-sectional view taken along plans 3I—3I of FIG. 3H.

Figure 3J:
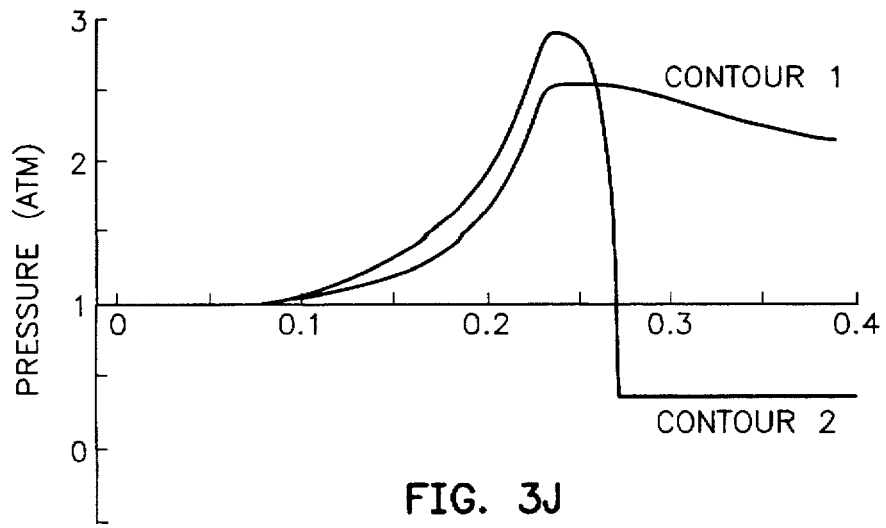

FIG. 3J is a graph of pressure contours along the slider of FIG. 3H.

Figure 4A:
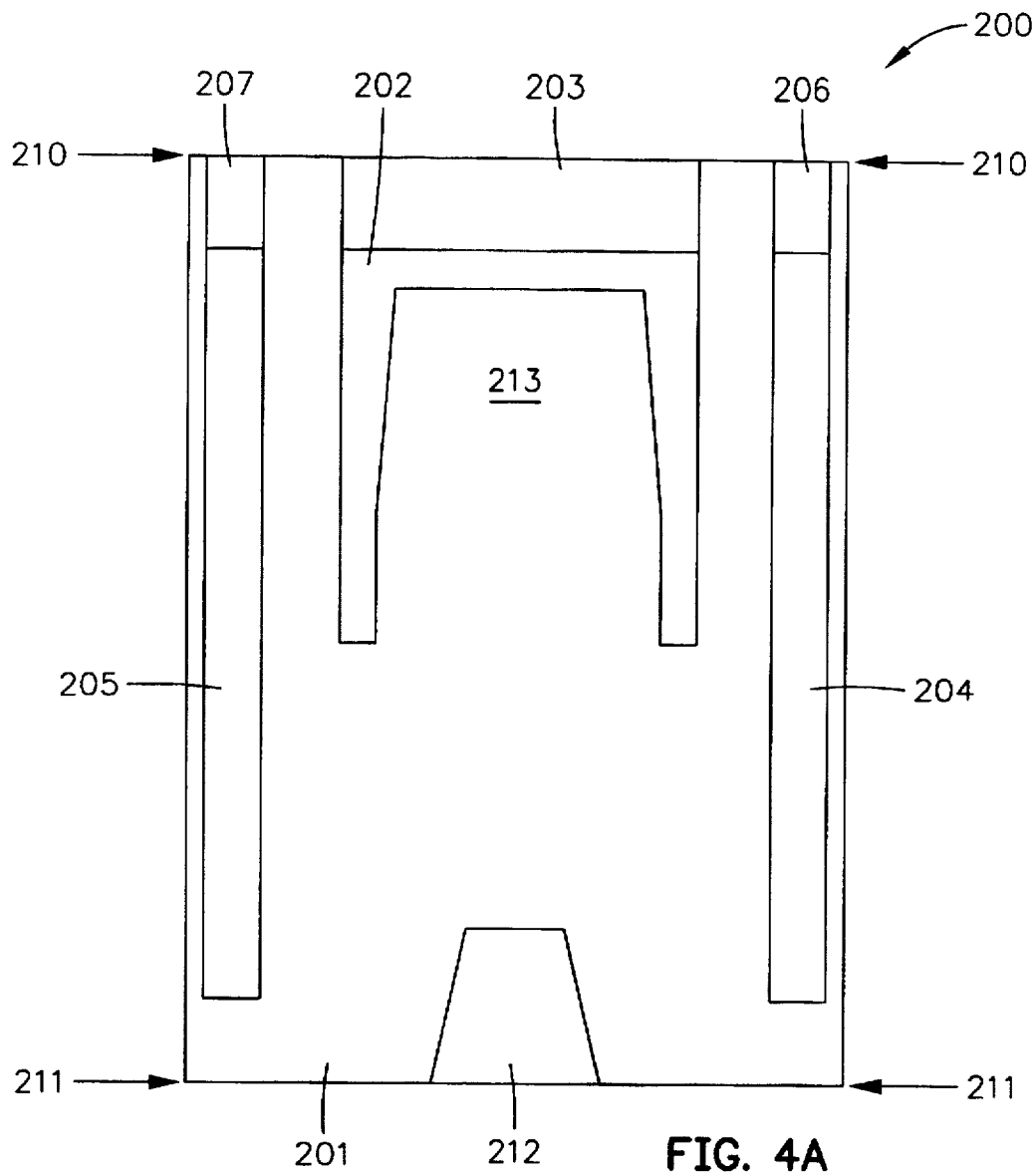
Figure 4B:

FIGS. 4A and 4B are bottom plan and rear elevation views, respectively, of a U-shaped rail air bearing slider structure according to a second embodiment of the present invention which includes an isolated island positioned between the side pads of the U-shaped rail.

Figure 5A:
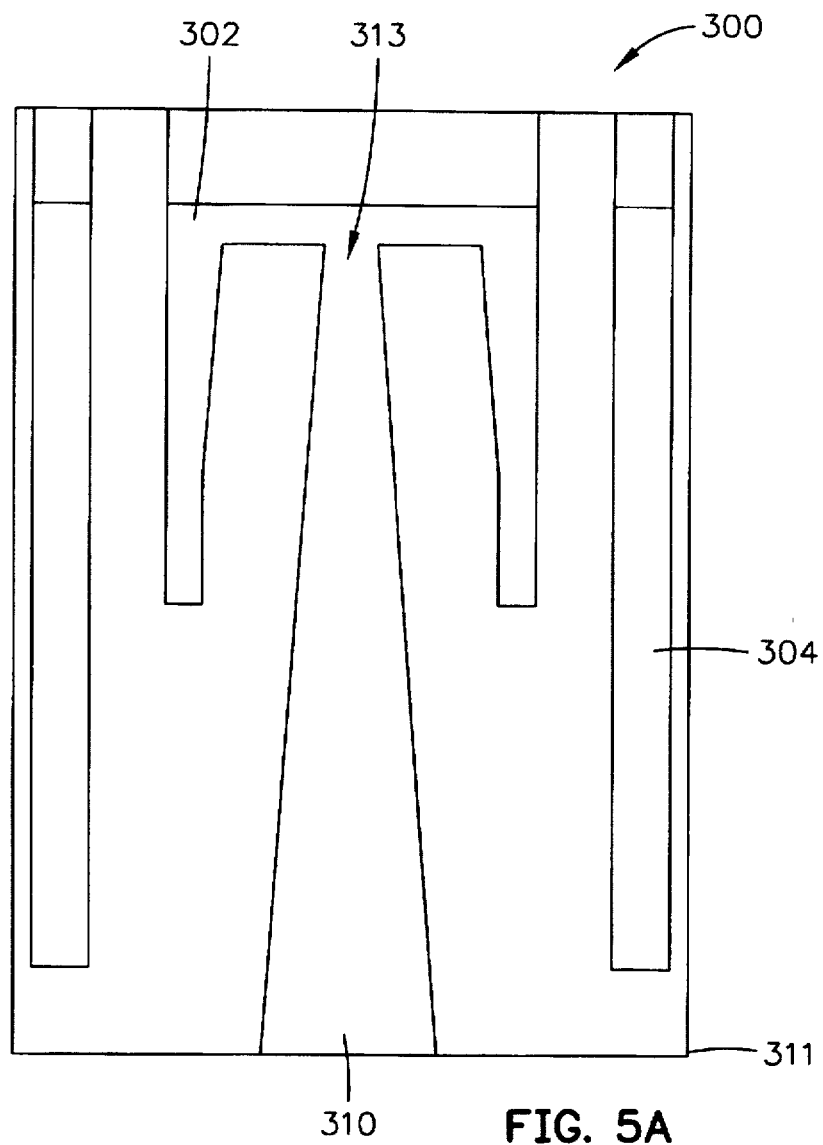
Figure 5B:
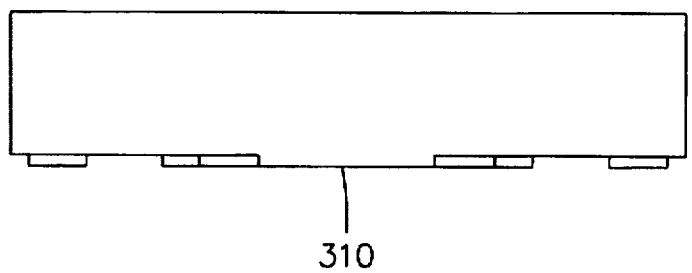

FIGS. 5A and 5B are bottom plan and rear elevation views, respectively, of a U-shaped rail air bearing slider structure according to a third embodiment of the present invention which includes load bearing means and a center rail attached to the U-shaped rail.

Figure 6A:
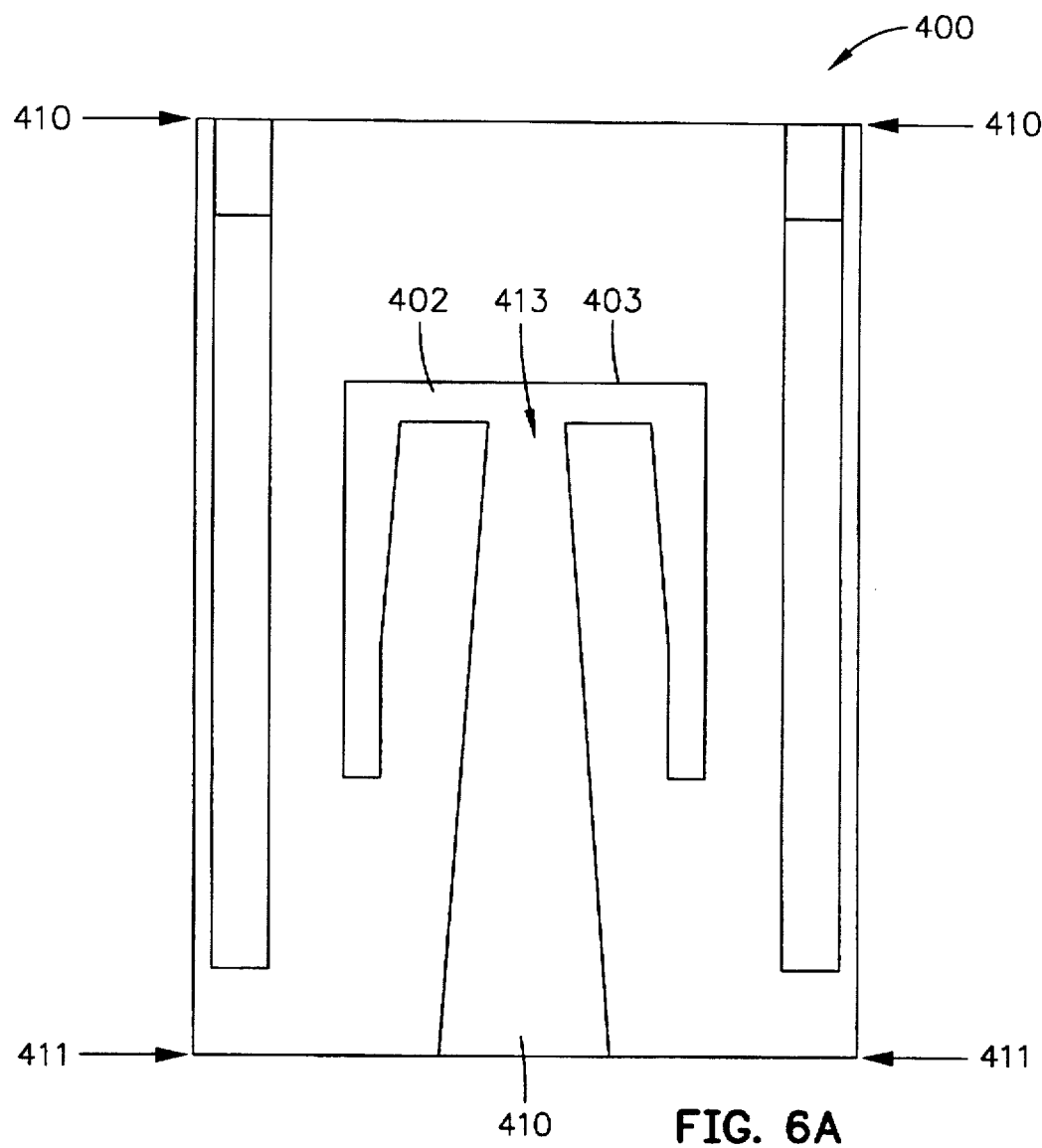
Figure 6B:
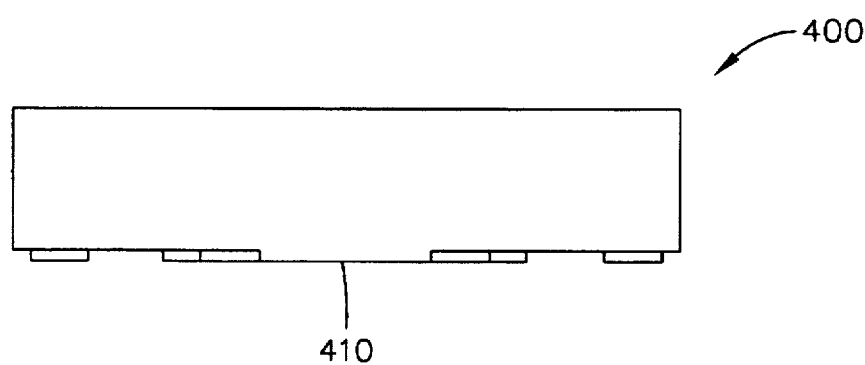

FIGS. 6A and 6B are bottom plan and rear elevation views, respectively, of a U-shaped rail air bearing slider structure according to a fourth embodiment of the present invention in which a curved portion of the U-shaped rail is positioned near the center of the first surface of the slider structure.

Figure 7A:
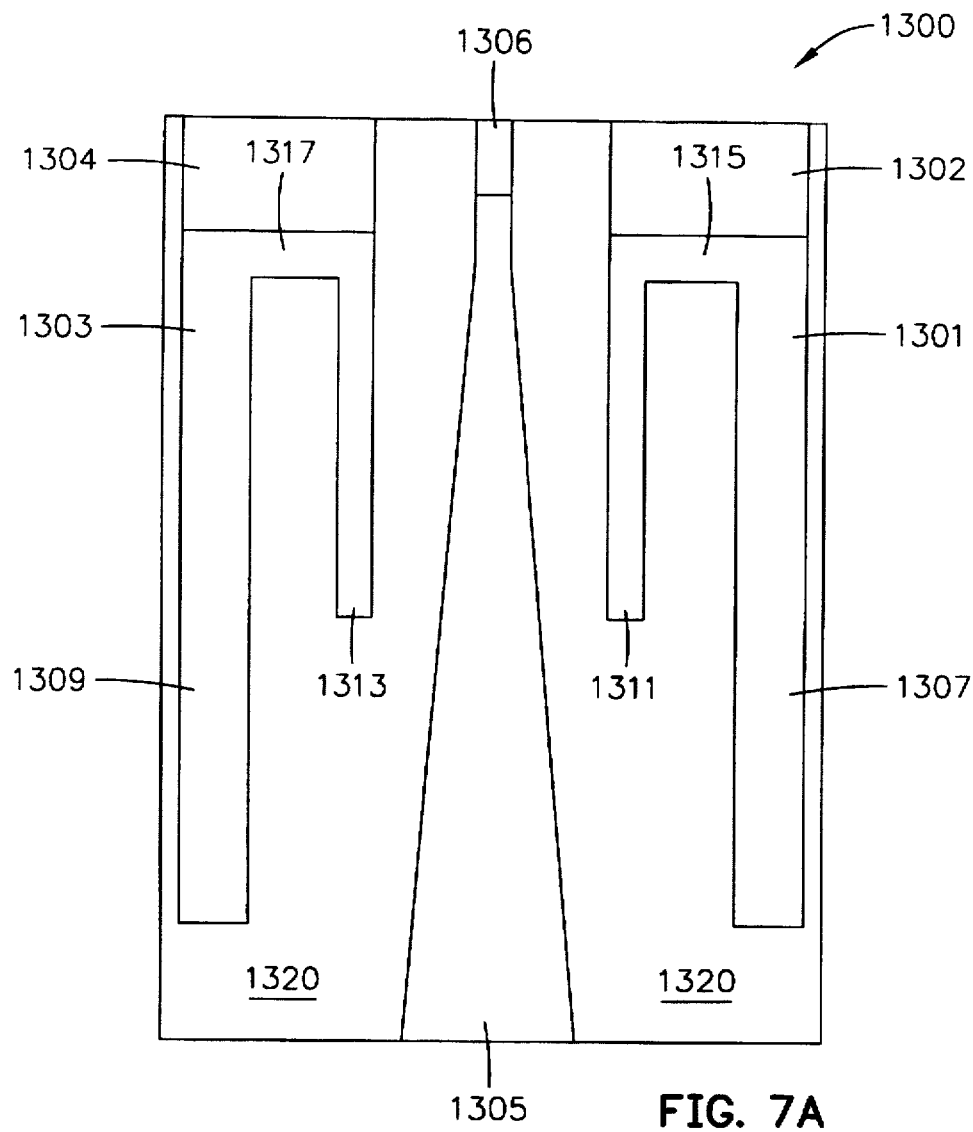
Figure 7B:
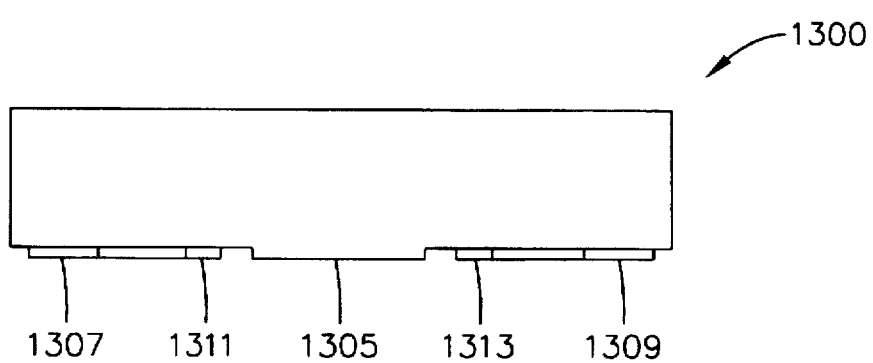

FIGS. 7A-7B are bottom plan and rear elevation views, respectively, of an alternate embodiment of the slider structure of the present invention which employs two U-shaped rails separated by a center rail.

Figure 8A:
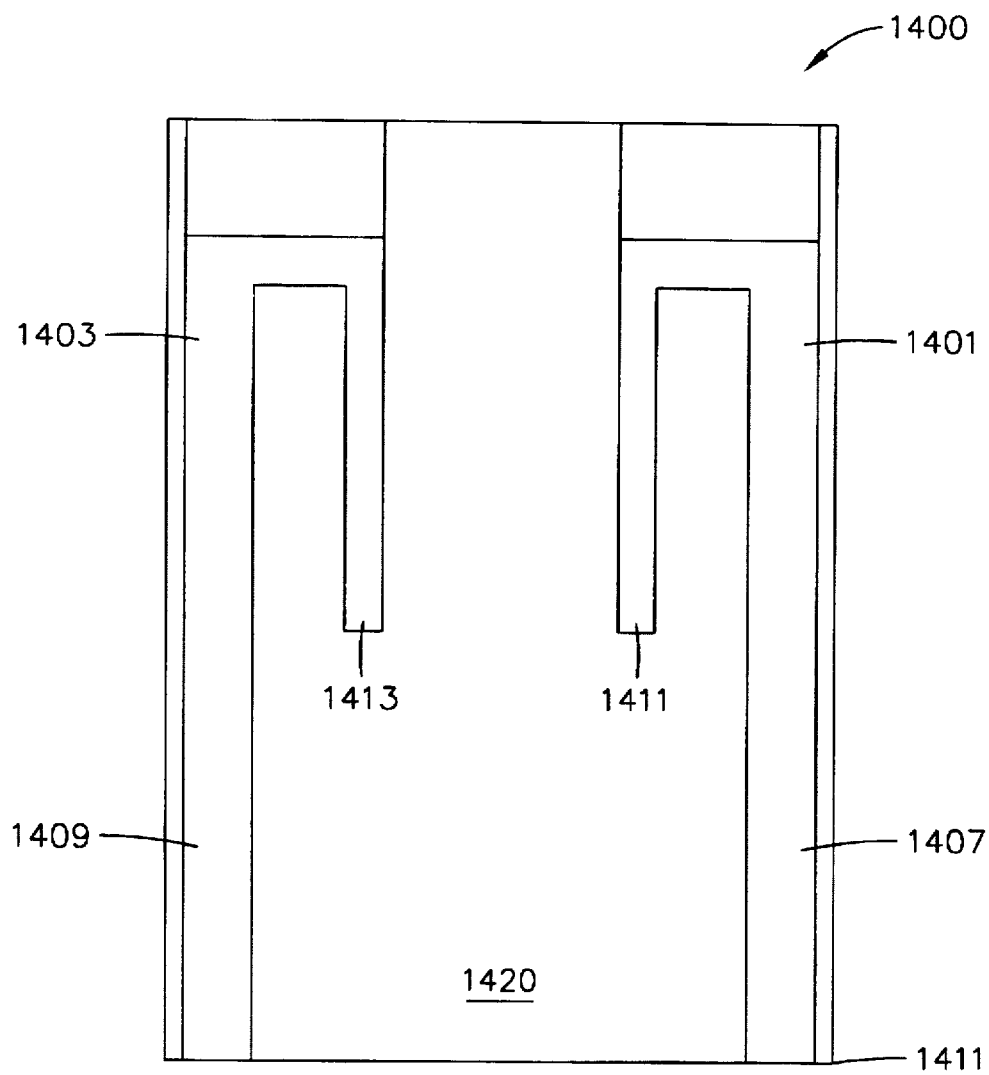
Figure 8B:

FIGS. 8A and 8B are bottom and rear elevation views, respectively, of a slider structure similar to that of FIGS. 7A and 7B, but wherein outside rails have been adapted to support a read/write element.

FIGS. 9A-9D illustrate bottom plan views of various prior-art slider configurations and a U-shaped rail air bearing slider according to the invention.

Figure 9A:
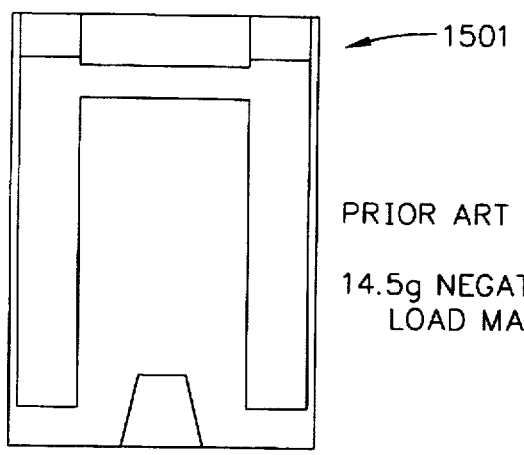
Figure 9B:
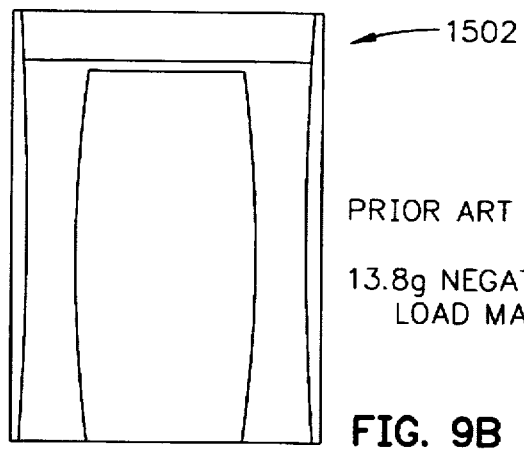
Figure 9C:
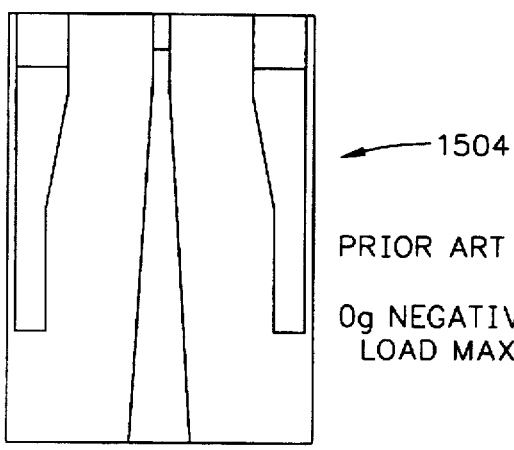
Figure 9D:
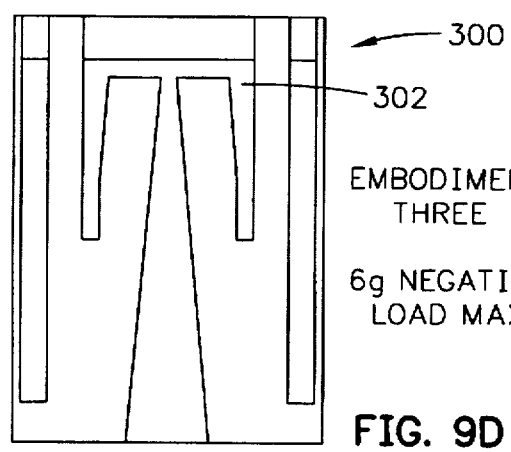
Figure 10:
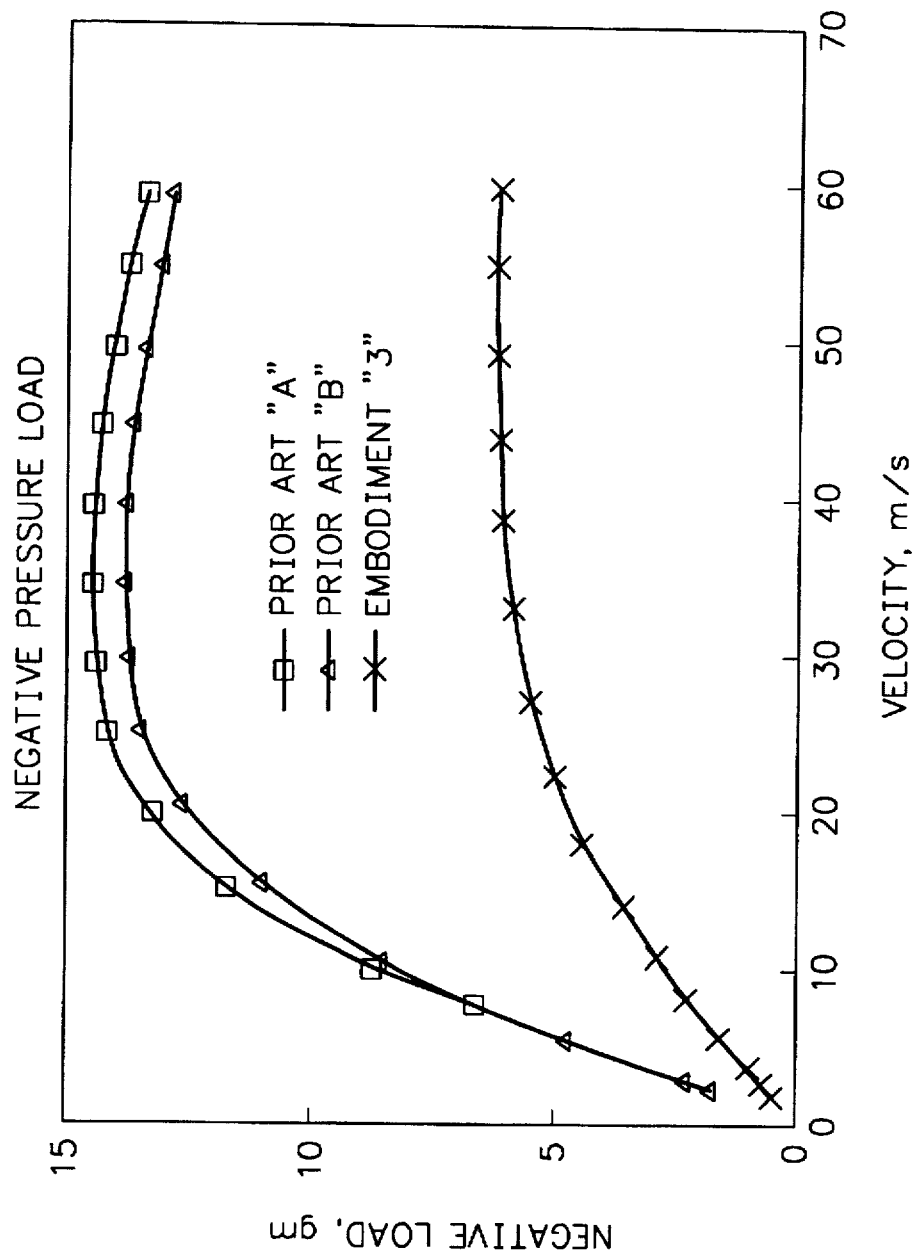

FIG. 10 graphically illustrates the magnitude of negative air pressure versus velocity for the slider structures shown in FIGS. 9A, 9B and 9D.

Figure 11:
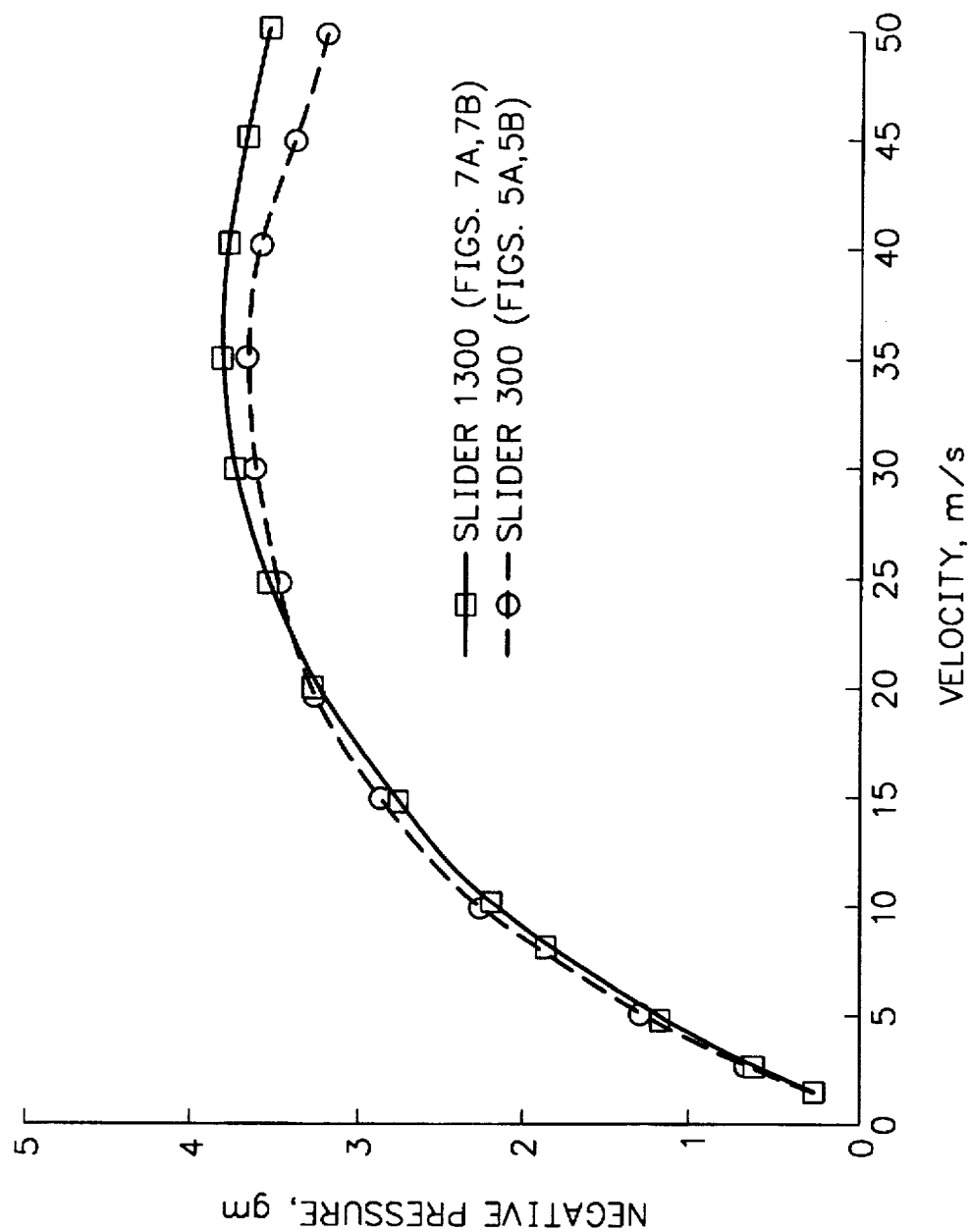

FIG. 11 graphically illustrates the magnitude of negative air pressure versus velocity for two slider structures according to the invention.

Figure 12:
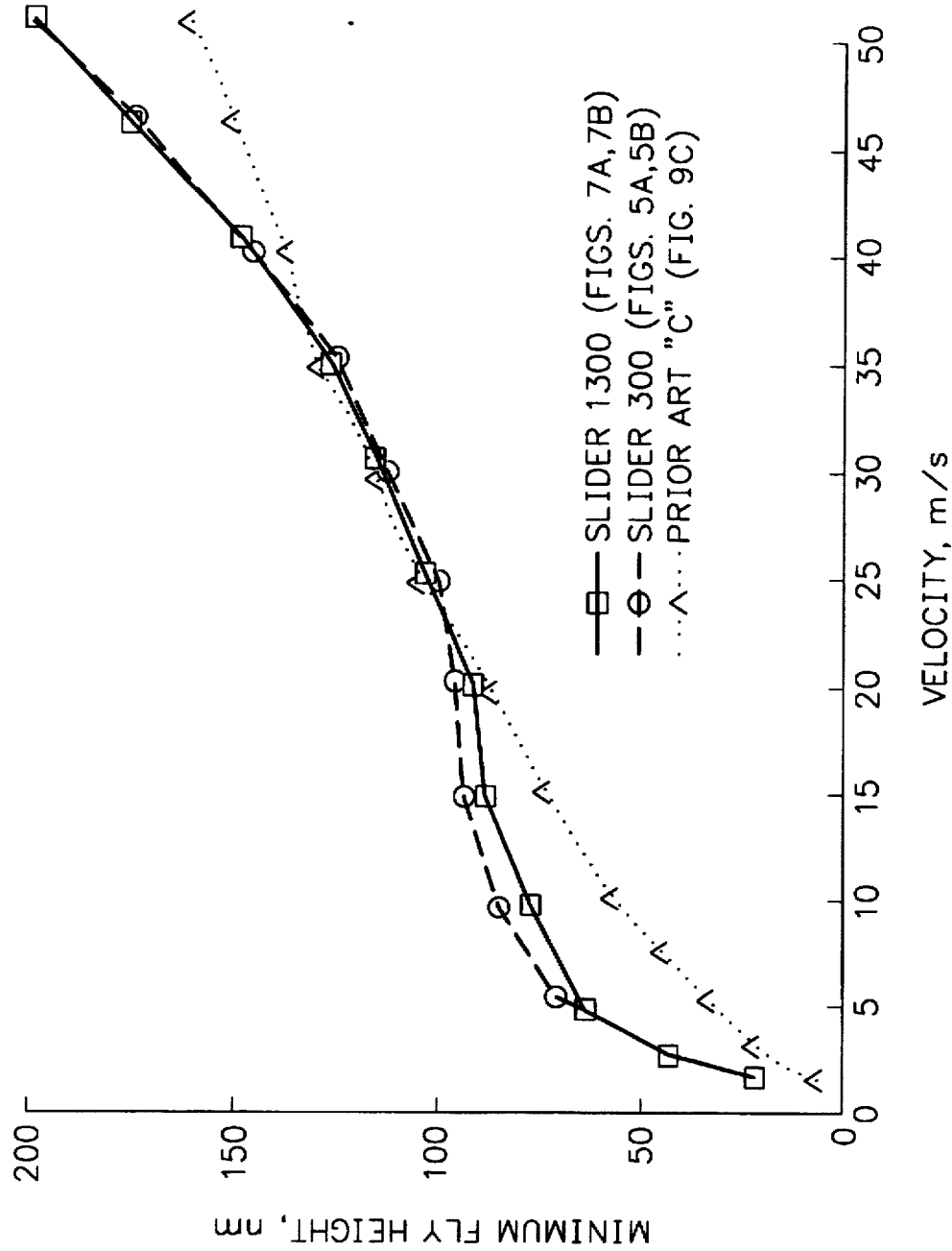

FIG. 12 graphically illustrates velocity versus flying height for the slider structures shown in FIGS. 5A and 5B, 7A and 7B, and 9C.

DETAILED DESCRIPTION OF THE PREFERRED EMBODIMENTS

THE INDUSTRIAL ENVIRONMENT

Figure 1:
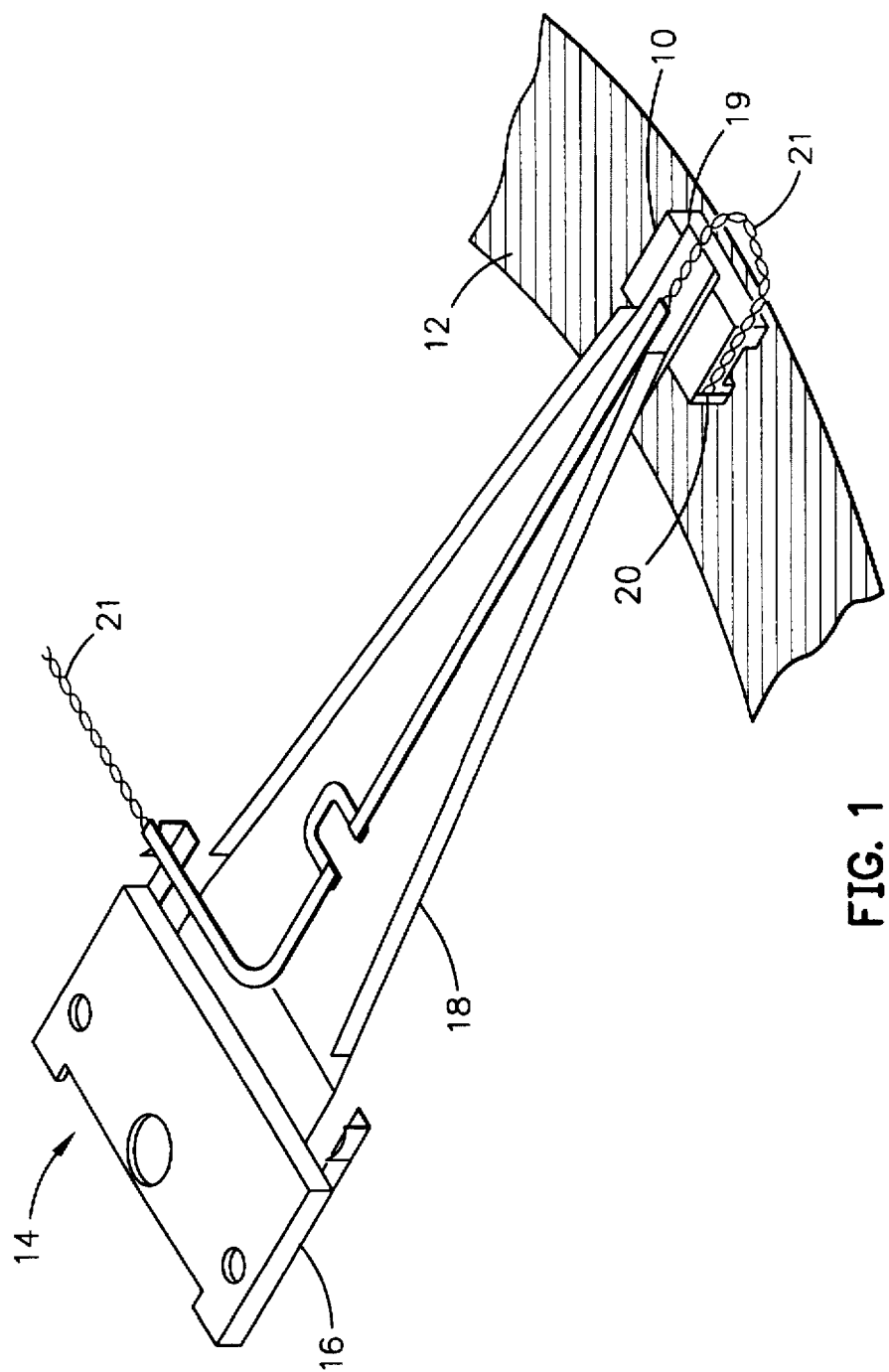
FIG. 1 is a perspective view illustrating the operational environment of the present invention in the context of a data storage drive mechanism.

FIG. 1 is a perspective view illustrating means for employing the present invention in a direct access storage device (DASD). In this regard, the invention concerns a slider 10 which is supported in a DASD with respect to a disk surface 12 by a slider suspension assembly 14 which includes a mount plate 16 and load beam 18. The slider 10 is attached to the load beam 18 by means of a flexure 19. A data read/write transducer 20 is mounted on the slider 10. One or more leads 21 connect the transducer 20 to DASD electronics.

Figure 2:
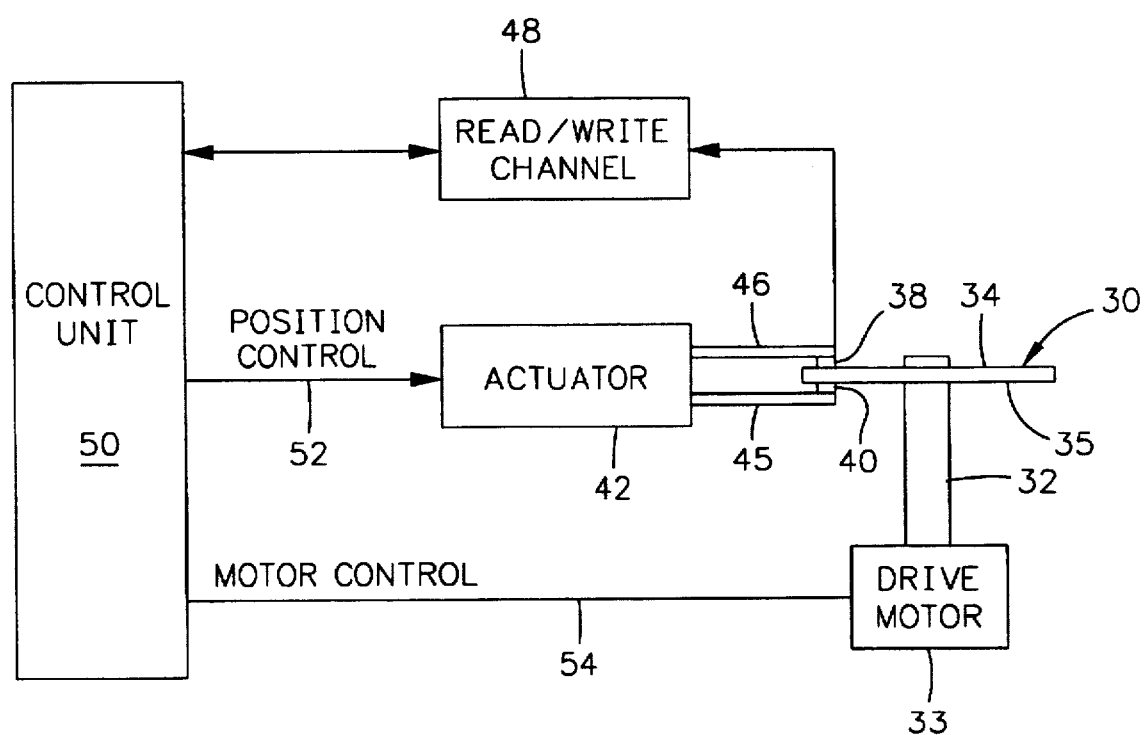
FIG. 2 is a block diagram illustrating the operational environment of the present invention in the context of a data storage drive mechanism.

FIG. 2 is a block diagram illustrating the essential complement of functional components in a DASD employing the slider design of this invention. Although FIG. 2 illustrates a single-disk device, it is to be understood that this is not intended to limit the practice of the invention to such devices. In fact, the invention is applicable as well to DASD's with multiple disks.

In FIG. 2 the disk 30 is mounted on a rotatable spindle 32 that is rotated by a drive motor 33. The disk 30 has an upper surface 34 and a lower surface 35. A slider 38 with a transducer mounted thereon faces the upper surface 34. Another slider 40 with a transducer mounted thereon faces the lower surface 35. The sliders 38 and 40 are positioned with respect to these surfaces 34 and 36 by respective movable slider arm assemblies 45 and 46. The arm assemblies are conventionally mounted to an actuator 42. The transducers on the sliders 38 and 40 are connected to conventional data channel electronics. In FIG. 2 read/write channel electronics 48 are shown only for the slider 38, it being understood that the transducer on the slider 40 is similarly supported in the DASD. A control unit 50, typically in the form of a processor, provides position control signals on a signal path 52 to the actuator 42. These signals control the positions of the slider 38 and 40 with respect to the surfaces of the disk 30. The control unit 50 provides motor speed control signals to control the rotational speed of the drive motor 33. The control unit 50 also processes read and write signals for the transducer on the slider 38 by way of the read/write channel electronics 48.

Each slider 38 and 40 may support one or more read/write transducers. As the disk 30 rotates, the sliders 38 and 40 are moved radially in and out over their respective disk surfaces so that the read/write transducers may access different portions of the disk 30 where desired data is recorded. Each slider 38 and 40 is attached to a respective actuator arm 45 and 46 by means of a suspension mechanism.

During operation of the DASD, the rotation of the disk 30 forces air between each of the sliders 38 and 40 and its respective disk surface by means of a progressive elevation feature, typically a taper or a series of one or more steps defined on the slider surface. This cushion of air (an "air bearing") exerts an upward force against a slider, which counterbalances an opposing disk-directed force exerted on the slider. The balance of forces supports a slider off of a disk by small, substantially constant spacing ("flying height") during operation. In negative-pressure sliders, the upward force is exerted against spaced-apart taper-flat slider rails; the opposing force is exerted by a recessed area on the slider surface between the rails which creates a suction acting between the slider and the disk surface. The balance between the forces results in a very slight positive load on the slider, while the rails provide a very stiff bearing.

The flying height of a slider is the distance between a particular point on a slider and the disk surface when the slider is supported on its cushion of air. Typically, the slider point coincides with a transducer location; usually, this location is at the trailing edge of the slider. It should also be noted that the terms "spacing" and "slider spacing" when used in the description and drawings are synonymous with flying height.

THE INVENTION

FIGS. 3A and 3B illustrate bottom plan and rear elevation views, respectively, of a U-shaped rail air bearing slider structure 100 in accordance with a first embodiment of the present invention. The slider structure 100 is designed to be used in a data storage device having a storage medium engaged in motion relative to the slider during data read/ write operations. The slider structure includes a supporting surface 101 which, in the industrial environment, is positioned adjacent to and facing the data storage medium. The U-shaped rail 102 is positioned between two outer taper-flat rails 104 and 105, each of which extend outwardly from supporting surface 101 by offset height 125. An intermediate surface 124 may be enclosed by the U-shaped rail 102, and is offset from supporting surface 101 by offset height 123. The intermediate surface 124 is in turn offset from an air bearing surface of the U-shaped rail 102 by offset height 122. The rails 104 and 105 include respective forward tapers 106 and 107. The slider structure 100 has a leading edge 110, a trailing edge 111, and respective side edges 112 and 113. The U-shaped rail 102 includes a cross rail portion 114 which transitions to a forward tapered section 115. As shown in FIG. 3A, the cross rail portion 114 extends laterally across less than the full width of the slider structure 100 between the side rails 104 and 105. The U-shaped rail 102 also includes a pair of side rails 116 and 117 which are substantially parallel with the forward sections of the side rails 104 and 105 and which join the cross rail portion 114 to form a three-sided enclosure enclosing an area 118 on the intermediate surface 124. Flow through channels 120 and 121 are formed between side rail 116 and taper flat rail 104, and side rail 117 and taper flat rail 105, respectively. FIG. 3C illustrates a cross sectional view of slider 100 in FIG. 3A through the centerline of U-shaped rail 102. Cross rail portion 114, side rail 116 and outer taper flat rail 104 extend from supporting surface 101 by offset height 125. Intermediate surface 124 is offset from supporting surface 101 by offset height 123, and is offset from the bottom surface of cross rail 114 by offset height 122. Taper section 115 extends forward and angles downward from cross rail 114. FIG. 3D shows a cross-sectional view of an alternative embodiment of the present invention where step 126 is located adjacent to cross rail 114. The bottom surfaces of the rails 104 and 105, the cross rail 114 and the side rails 116 and 117 provide an air bearing surface (ABS).

During operation, the slider structure is supported on an air bearing between the ABS and the rotating disk 30. Air is compressed by one or more progressive elevation features and forced under the slider generating a negative pressure force in area 118 enclosed on three sides by the U-shaped rail 102. Progressive elevation features may consist of tapers 106, 107, and 115, a series of one or more steps 126, or any other combination of tapers and steps. A lifting force is generated by air compressed by tapered portions 106 and 107, and the outer pads 104 and 105. Negative pressure is generated by air compressed by the tapered portion 115 and cross bar 114 and then subsequent expansion into area 118. In order for air expansion to occur, cross bar 114 must be offset from intermediate surface 124 by offset height 122. This is explained in FIGS. 3E–3J. FIG. 3E shows a prior art slider with a U-shaped rail where the crossbar is fully contained within the taper portion. There is no offset height between the crossbar and the bottom surface as illustrated in FIG. 3F. The resulting pressure profile is shown in FIG. 3G. Contour 1 is the positive pressure produced by the outer taper flat side rails. Contour 2 shows the pressure produced along the center of the U-shaped rail at section 3F—3F. Note this pressure is positive and near ambient as the air is only slightly compressed and not permitted to expand. But the slider with U-shaped rail shown in FIG. 3H provides an area for this expansion. FIG. 3I illustrates a crossbar with an offset height from the supporting surface. The pressure contours generated by this geometry are shown in FIG. 3J. Once again, contour 1 is the positive pressure produced by the outer taper flat side rails, and contour 2 shows the pressure produced along the centerline of the U-shaped rail. Initially positive pressure is generated as the air is compressed by the taper and crossbar. But then the air expands as it flows past the crossbar and into the offset portion of the bottom surface, creating the subambient negative pressure shown by contour 2. The suction force produced by this negative pressure is substantially larger than the added lift force created by the added area of the crossbar, such that the slider in FIG. 3H actually flies lower than the slider in FIG. 3E. Without offset height 122, negative pressure will not be generated. The amount of negative air pressure generated by the slider structure 100 is controlled by the length and width of the area 118.

The two outer taper-flat rails 104 and 105 are each situated substantially adjacent to a respective side edge. These rails provide roll stiffness and may be extended to the rear surface 108 to provide a mounting location for read/write transducers. As FIG. 3A illustrates, the rails 104 and 105 have substantially constant widths from the leading edge 110 to the tips of the rails 116 and 117. From there to the trailing edge 111, the widths of the pads 104 and 105 increase constantly. Channels 120 and 121 provide a path for air flow through the length of the slider for continuous flushing of contamination and debris. Intermediate surface 124 bounded by U-shaped rail 102 is offset from supporting surface 101 by offset height 123 to facilitate debris removal from the slider, as well as further constrain the negative pressure generation to area 118. Offset height 123 may be varied or even eliminated completely according to design requirements. In this instance, surfaces 101 and 124 would lie in a common plane. Skew insensitivity is achieved by adjusting the relative lengths and widths of side rails 116, 117 and the widths of outer rails 104, 105. Adjusting the widths of these rails changes the amount of positive pressure lift force generated by the slider. Independently, the relative lengths of side rails of the U-shaped pocket 116 and 117 adjust the amount of negative pressure generated. By balancing the positive and negative pressure as a function of skew angle, a constant fly height is achieved.

As shown in FIG. 3A (and in the embodiments illustrated in FIGS. 4A, 5A and 6A), the U-shaped rail is formed on the bottom surface of the slider at a location which is centered between, but separated from the side rails. This structure characterizes the first through the fourth embodiments of the invention.

FIGS. 4A and 4B are bottom plan and rear elevation views, respectively, of a U-shaped rail air bearing slider structure 200 in accordance with a second embodiment of the invention. The slider structure 200 corresponds essentially to the slider structure 100 of FIGS. 3A and 3B in having a U-shaped rail 202 with a forward taper 203 that extends outwardly from the sup-porting surface 201 and is centered laterally between two outer taper-flat rails 204 and 205 with forward tapers 206 and 207, respectively. Unlike the earlier embodiment of the invention shown in FIG. 3A, an intermediate surface is not shown offset from supporting surface 201 in region 213 bounded by U-shaped rail 202, as illustrated in FIG. 4A. Moreover, unlike the taper-flat rails 104 and 105 of FIG. 3A, the taper-flat rails 204 and 205 in FIG. 4A exhibit a continuous width. However, the outer taper-flat rails 204 and 205 do not extend along the full length of the bottom surface 201 from leading edge 210 to trailing edge 211. Rather, the rails 204 and 205 are offset from the trailing edge 211 to minimize roll sensitivity. An isolated island 212 is provided on the supporting surface 201 at a position which abuts the trailing edge 211 and is centered between the legs of the U-shaped rail 202. This island provides a site at which a data read/write transducer is mounted.

FIGS. 5A and 5B illustrate bottom plan and rear elevation views, respectively, of a U-shaped rail air bearing slider structure 300 in accordance with the third embodiment of the present invention. The slider structure 300 is essentially identical with the slider structure 200 illustrated in FIGS. 4A and 4B with exception that it does not include an isolated island. Rather, the slider structure in FIGS. 5A and 5B includes a center rail 310 which is adapted to carry a data read/write transducer at the trailing edge 311. The center rail 310 extends from the vertex 313 of the U-shaped rail 302 to the trailing edge 311 of the slider structure 300. The width of the center rail 310 increases continuously from the vertex 313 to the trailing edge 311. The center rail provides added lift force and improved pitch stability.

FIGS. 6A and 6B illustrate bottom plan and rear elevation views, respectively, of a U-shaped rail air bearing slider structure 400 in accordance with a fourth embodiment of the present invention. The slider structure 400 corresponds essentially to the slider structure 300 of FIGS. 5A and 5B. In this regard, the slider structure 400 includes on its supporting surface 401 a U-shaped rail 402. However, the rail 402 includes a forward edge 403 without an adjacent progressive elevation feature and is offset from the leading edge 410 of the slider structure in the direction of the trailing edge 411. This slider structure includes a center rail 410 which extends, with a constantly-increasing width, from the vertex 413 of the U-shaped rail 402 to the trailing edge 411. Positioning the U-shaped rail 402 in this manner provides a slider structure having desirable pitch angle and flying height properties. Although the crossbar does not utilize a progressive elevation feature, air still compresses over the crossbar and expands into the U-shaped area generating a negative pressure.

FIGS. 7A and 7B are bottom plan and rear elevation views, respectively, of an alternate embodiment of the slider structure of the present invention which employs two U-shaped rails separated by a center rail. In this alternate embodiment, the slider structure 1300 has two U-shaped rails 1301 and 1303 separated by a center rail 1305, these rails extending from the supporting surface 1320 of the slider. Rails 1301 and 1303 include forward tapered sections 1302 and 1304, respectively. The center rail 1305 includes a forward tapered section 1306. The U-shaped rail 1301 includes outer and inner rails 1307 and 1311, respectively, while the rail 1303 includes outer and inner rails 1309 and 1313, respectively. Although the outer rails 1307 and 1309 are illustrated as being longer and wider than the inner rails 1311 and 1313, the relative dimensions of length and width may be varied according to design requirements. The widths and lengths of the inner rails 1311 and 1313 may be wider and/or longer than the outer rails 1301 and 1303. The outer rails are positioned adjacent respective side edges of the slider to provide roll stiffness and to maintain the slider structure in a relatively high pitch angle. The length of the inner rails 1311 and 1313 and the width of the U-shaped rails 1301 and 1303 at the rail vertices 1315 and 1317, respectively, may be optimized for specific values of negative loading. Each of the U-shaped rails 1301 and 1303 may be altered independently, allowing the slider 1300 to be optimized for specific roll conditions and/or rotary skew environments. Either or both of the U-shaped pockets 1301 and 1303 may enclose an intermediate surface offset between supporting surface 1320 and the bottom surfaces of the U-shaped pockets 1301 and 1303, similar to surface 124 of the embodiment shown in FIG. 3A. Use of this intermediate surface allows for improved debris insensitivity and further localization and control of the generated negative pressure. The skew insensitivity of this geometry is enhanced by the added flexibility of adjusting the relative lengths and widths of rails 1301, 1303, 1311 and 1313 to balance the positive and negative pressure generated by two U-shaped rails, thus achieving a constant fly height.

FIGS. 8A and 8B illustrate bottom plan and rear elevation views, respectively, of a U-shaped rail air bearing slider structure 1400 which is essentially equivalent to the slider structure 1300 of FIGS. 7A and 7B. In this regard, the slider 1400 includes two U-shaped rails 1401 and 1404, respectively, which extend from the supporting surface 1420 of the slider. The U-shaped rail 1401 includes an outer rail 1407 adjacent a first side edge of the slider, which extends to the trailing edge 1411 of the slider 1400 and a shorter inner rail 1411. Similarly, the U-shaped rail 1403 includes an outer rail 1409 adjacent a second side edge of the slider and extending to the trailing edge 1411, and a relatively shorter inner rail 1413. The extension of the outer rails 1407 and 1409 to the trailing edge 1411 adapts them for supporting data read/write elements. This eliminates the need for a center rail in the slider structure 1400. Again, adjusting the relative lengths and widths of rails 1411 and 1413 as well as the widths of 1407 and 1409 can achieve constant fly height by balancing the positive and negative pressures as a function of skew angle.

FIGS. 9A–9D illustrate plan views for several air bearing slider structures, including various prior-art slider structures and a U-shaped air bearing rail structure according to the present invention. The slider structure of the third embodiment of the invention is illustrated in FIG. 9D. This slider structure 300 is identical to the structure shown in FIG. 5, and may hereinafter be referred to as the "Embodiment three" slider 300.

FIGS. 9A and 9B show prior-art negative-pressure slider structures, referred to as the Prior Art "A" slider 1501, and the Prior Art "B" slider 1502, respectively. The Prior Art "A" slider 1501 and the Prior Art "B" slider 1502 are less advantageous than the Embodiment three slider 300 shown in FIG. 9D. FIG. 9C illustrates a slider structure of the prior art, which is very similar to the positively loaded tri-rail, taper-flat structure commonly in use in presently-existing data storage drives. This prior-art slider structure is included in the present analysis for purposes of comparison only, and may be referred to as the Prior Art "C" slider 1504.

FIG. 10 is a graph showing negative loading versus velocity for the Embodiment three slider 300, the Prior Art "A" slider 1501, and the Prior Art "B" slider 1502. The test conditions reproduced conditions of the industrial environment illustrated in FIG. 1. In this regard, each slider was mounted to a suspension assembly and maintained thereby over a rotating disk. Standard modelling techniques were used to determine the negative loading produced by each slider in response to disk velocity. Referring to the graph of FIG. 10, the Embodiment three slider 300 exhibits relatively low negative loading as compared to the prior art slider designs. The Embodiment three slider 300 also exhibits adjustable negative pressure independent of flying height and rail etching depth. The design has relatively low sensitivity to fabrication tolerances and low sensitivity to data accessing skew. Improved damping is provided, as well as relatively fast take-off from the data storage medium surface.

FIGS. 11 and 12 provide graphical comparisons between the operation of the alternative embodiment slider 1300 and the Embodiment three slider 300. The comparison of FIG. 12 also considers the performance of a conventional Prior Art "C" slider 1504 (FIG. 9C).

The comparisons illustrated in FIGS. 11 and 12 were conducted using small sliders which measured 1.6 mm in width×2.5 mm in length. The resulting bottom surface area of the slider 1300 was 12% less than the slider 300 with the consequence that the slider 1300 provided improved stationary friction properties. Both the slider 1300 and the slider 300 utilized suspension loads of approximately 1 to 2 grams, which was four times less than the suspension loaded needed for the Prior Art "C" slider 1504. This reduction in suspension loads leads to superior start/stop performance and further reduces stiction.

The graph of FIG. 11 illustrates the low negative pressure achievable for two negative-pressure slider designs of the invention; namely, the slider 1300 and the slider 300.

The graph of FIG. 12 shows minimum flying height versus velocity for the Prior Art "C" slider 1504, the slider 300, and the slider 1300. The slider 1300 of the present invention takes off just as fast from the data storage medium surface as the slider 300, and much faster than the control Prior Art "C" slider 1504. The high take-off velocity is a characteristic shared by negative-pressure slider designs.

With reference to FIGS. 7A–7B, 11 and 12, the slider 1300 has advantages over presently-existing air bearing slider designs. The slider 1300 generates low negative pressure independent of etch depth and flying height. This slider also exhibits reduced sensitivity to manufacturing tolerances, and improved performance during the data storage medium access operations. Furthermore, the slider features rapid take-off from the surface of the data storage medium, constant flying height in rotary actuator skew environments and flow through channels for contamination flushing.

A number of specific embodiments of the present invention have been described. Nevertheless, it will be understood that various modifications and changes may be made without departing from the spirit and scope of the invention. As an example, each of the tapers of the taper flat side rails adjacent the side edges of the sliders shown in FIGS. 3–6 and the taper flat of the center rail of the slider shown in FIG. 7A can be stepped with one or more steps as shown at 126 and 114 in FIG. 3D instead of being a taper. This same modification can be made to the tapers of the cross rails of the U-shaped rails of the sliders shown in FIGS. 4, 5, 7 and 8. Further, the step at 403 in FIG. 6A can be a multiple step, as shown in FIG. 3D, or a taper, as shown in FIG. 3C. Another modification is to provide an offset as shown at 123 in FIG. 3C for each of the areas enclosed by the U-shaped rails in FIGS. 4–8. Accordingly, it is to be understood that the invention is not to be limited by the specific illustrated embodiments, but only by the scope of the appended claims.

We claim:

1. A slider for supporting a transducer in relation to a moving data storage medium, comprising:

a slider structure with a leading edge, a trailing edge, and first and second side edges;

a bottom surface bounded by said leading, trailing and side edges;

a first U-shaped rail on and projecting outwardly from said bottom surface, said first U-shaped rail including:

a cross rail substantially parallel with said leading edge and extending across less than one-half a width of said bottom surface;

the cross rail having a taper-flat which includes a taper portion and a flat portion;

the taper portion of the cross rail and the leading edge of the slider being parallel with respect to one another and the taper portion tapering in height from the flat portion toward the leading edge of the slider;

a first side rail substantially perpendicular to and adjoining said cross rail, said first side rail substantially adjacent and parallel to the first side edge and extending from said cross rail towards said trailing edge;

a second side rail, substantially parallel to said first side rail and offset from said first side rail toward the center of said bottom surface;

the second side rail being shorter than the first side rail; and a second U-shaped rail projecting outwardly from said bottom surface, said second U-shaped rail including:

a cross rail substantially parallel with said leading edge and extending across less than one-half a width of said bottom surface;

the cross rail having a taper-flat which includes a taper portion and a flat portion;

the taper portion of the cross rail and the leading edge of the slider being parallel with respect to one another and the taper portion tapering in height from the flat portion toward the leading edge of the slider; and a first side rail substantially perpendicular to and adjoining said cross rail, said first side rail substantially adjacent and parallel to the second side edge and extending from said cross rail towards said trailing edge;

a second side rail, substantially parallel to said first side rail and offset from said first side rail toward the center of said bottom surface; and the second side rail being shorter than the first side rail, whereby, upon moving said data storage medium adjacent the slider, the rails of the first and second U-shaped rails produce positive pressures and areas within the U-shaped rails produce negative pressures which are dependent upon the shortness of said second side rails.

2. A data storage drive including the slider of claim 1, the drive comprising:

the movable data storage medium;

means for moving the movable data storage medium; and means for supporting the slider adjacent the movable data storage medium.

3. A slider as claimed in claim 1 including:

the flat portion of the cross rail and the first and second side rails of the first and second U-shaped rails having surfaces which lie in a common plane for producing said negative pressures.

4. A slider as claimed in claim 3 including:

the tapered portion of each cross rail being adjacent said leading edge of the slider.

5. An air bearing slider for use with a data storage drive having a movable storage medium, said air bearing slider including:

a slider body having a supporting surface which is bounded by leading and trailing edges and a pair of side edges, the supporting surface being adapted for facing the movable storage medium; and first and second U-shaped rails on said supporting surface, each U-shaped rail including:

a cross rail projecting from said supporting surface, and substantially parallel with said leading edge and extending across less than a full width of said supporting surface as defined by the side edges;

the cross rail having a progressive elevation portion and a flat portion;

the progressive elevation portion of the cross rail and the leading edge of the slider being parallel with respect to one another and the progressive elevation portion decreasing in height from the flat portion toward the leading edge of the slider;

first and second side rails projecting from said supporting surface, each of said side rails extending from said cross rail in the direction of said trailing edge;

the second side rail being shorter in its extension from said cross rail in the direction of the trailing edge than the extension of the first side rail in its extension from the cross rail in the direction of the trailing edge; and the first side rail of the first U-shaped rail being immediately adjacent one of said side edges and the first side rail of the second U-shaped rail being immediately adjacent the other side edge.

6. The air bearing slider of claim 5 including:

each of said side rails extending from the cross rail to a respective point offset from said trailing edge.

7. An air bearing slider for use with a data storage drive having a movable storage medium, said air bearing slider including:

a slider body having a supporting surface which is bounded by leading and trailing edges and a pair of side edges, the supporting surface being adapted for facing the movable storage medium; and first and second U-shaped rails on said supporting surface, each U-shaped rail including:

a cross rail projecting from said supporting surface, and substantially parallel with said leading edge and extending across less than a full width of said supporting surface as defined by the side edges;

the cross rail having a progressive elevation portion and a flat portion;

the progressive elevation portion of the cross rail and the leading edge of the slider being parallel with respect to one another and the progressive elevation portion decreasing in height from the flat portion toward the leading edge of the slider;

first and second side rails projecting from said supporting surface, each of said side rails extending from said cross rail in the direction of said trailing edge;

the second side rail being shorter in its extension from said cross rail in the direction of the trailing edge than the extension of the first side rail in its extension from the cross rail in the direction of the trailing edge; and the progressive elevation portion of the cross rail being adjacent to and extends along the leading edge;

the first side rail being positioned adjacent a respective side edge of the slider, and the second side rail being positioned parallel to the first side rail, but offset from the first side rail toward an opposite side edge of the slider; and the cross rail of one of said U-shaped rails being spaced from the cross rail of the other U-shaped rail.

8. The air bearing slider of claim 7 including:

the progressive elevation portion being a stepped elevation.

9. The air bearing slider of claim 7 including:

the progressive elevation portion being a taper.

10. The air bearing slider of claim 7 including:

each of said first and second side rails having a surface which projects from the supporting surface which defines an air bearing surface; and each of said U-shaped rails enclosing an area which has an intermediate surface which is intermediate the supporting surface and the air bearing surface.

11. The air bearing slider of claim 7 including:

each of said first and second side rails having a surface which projects from the supporting surface which defines an air bearing surface; and each of said U-shaped rails enclosing an area which has a surface which is coplanar with the supporting surface.

12. The air bearing slider of claim 11 including:

the progressive elevation portion being a taper.

13. The air bearing slider of claim 7, wherein the first side rail of at least one U-shaped rail extends from the leading edge to the trailing edge.

14. The air bearing slider of claim 7, wherein the first side rail of each U-shaped rail extends to a point offset from the trailing edge, the air bearing slider further including a taper-flat center rail centered between said two U-shaped rails on said supporting surface and extending from said leading edge to said trailing edge.

15. An air-bearing slider for use with a data storage drive having a movable medium, said air-bearing slider comprising:

a slider body having an air bearing surface which projects from a supporting surface and is locatable adjacent the movable storage medium, the supporting surface being bounded by leading and trailing edges and first and second side edges;

two U-shaped rails on said supporting surface and projecting therefrom, each U-shaped rail including:

an elongated cross rail having a length along a longitudinal axis, the longitudinal axis of the cross rail and the leading edge of the slider being substantially parallel with respect to one another and the length of the cross rail extending across less than a width of the slider as defined between the slider's first and second side edges;

the cross rail having an elongated taper surface portion and an elongated flat surface portion, each of the taper surface portion and the flat surface portion having a longitudinal axis which extends substantially parallel to the leading edge of the slider;

the taper surface portion of the cross rail being located adjacent to the flat surface portion of the cross rail and sloping from the flat surface portion toward the leading edge of the slider and toward a plane defined by the supporting surface;

first and second side rails interconnected by the cross rail, each side rail having a flat surface which extends from the flat surface portion of the cross rail toward the trailing edge of the slider;

the second side rail being shorter than the first side rail;

the taper surface portion of the cross rail being adjacent the leading edge of the slider;

the flat surface portion of the cross rail and the flat surface of each one of said side rails lying substantially in a common plane which forms at least a portion of the air bearing surface of the slider;

the first side rail being positioned adjacent a respective side edge of the slider, and the second side rail being positioned parallel to the first side rail, but being offset from the first side rail towards an opposite side edge of the slider; and the cross rail of one of said U-shaped rails being spaced from the cross rail of the other U-shaped rail.

16. An air bearing slider as claimed in claim 15 comprising:

only the supporting surface of the slider and the air bearing surface of the slider facing the movable storage medium when the air bearing surface is located adjacent the movable storage medium.

17. An air bearing slider as claimed in claim 15 comprising:

the first side rail of at least one U-shaped rail extending from the respective cross rail to the trailing edge of the slider.

18. An air bearing slider as claimed in claim 15 comprising:

the second side rail of each U-shaped rail extending to a point offset from the trailing edge of the slider; and a taper-flat center rail centered between said two U-shaped rails on said bottom surface and extending from said leading edge to said trailing edge of the slider.

* * * * *